(12) United States Patent
Morrison

(10) Patent No.: X8193
(45) Date of Patent: May 13, 1834

(54) WHEL HUBS, BORING ON THE INSIDE, & THE BOXES FOR LINCH CUPS

(76) Inventor: John R. Morrison

John R. Morrison
Letters Patent

The schedule referred to in these Letters Patent, and making part of the same, containing a description in the words of the said John R Morrison himself of his improvement in the Machine for boring out the inside of the hubs of wheels, and also in boring out the opening for the boxes and linch cups.

To all to whom these presents shall come: Be it known that I, John R. Morrison, of Springfield, Jefferson County, and State of Ohio, have invented a new and useful improvement in "Boring out the inside of the hubs of wheels, and also in boring out the opening for the boxes and linch cups" and that the following is a full and exact description of the construction and operation of the said Machine, as invented or improved by me.

A bench is to be constructed of suitable hard stuff of about 22 inches in hight supported by four legs. The top to be of about 12 inches in breadth by 14 1/2 in length and 1 1/4 inch in thickness. In the centre of this top board, is to be formed a hole quite through, and from the same centre are to be markeed out a number of circles of different sizes. At each end of the length of
this top board, is to be attached to the under side an iron
hook or projection bending down wards, for the purpose
of hooking fast to an iron rod, which has its lower end
flattened and perforated with holes for that purpose,
these rods of which there are two, of about two feet in length,
one at each end, rise perpendicularly to the cast iron frame
above, and have at their top end, each a screw and nut.
This cast iron circular frame, is to be of about 10 inches
in diameter outside, by about 1/4 inch by 1/8 in thickness
square. On a line with the diameter, and projecting beyond
the outside of said frame, are to be formed two projections
of the same thickness as the rest of the frame, opposite to
each other, having at the end of each a groove for the pur-
pose of receiving the end of the rod, and its nut above
described; at the other end of the projection, in the
part joing the circular frame, is another groove, in the line
of the diameter of about 1/4 inch in length and about 3/8 in
width for the reception of screw bolts to slide in. Beneath
these grooves, and to the under side of the frame is secured
to each a wing of cast iron, by means of the bolt and groove
just described, and by which it may be turned into present-
ing either side required towards the mandrel. These sides
are to be formed into concave circles of different circumfe-
rences to each. About half way between these projections is
to rise from the frame in an oblique line, tending to the centre,
an arm of the same metal of about 3 inches in height, having
the top flattened, in a plane parallel to that of the frame
presenting a surface of about 2 inches in diameter, with
a hole through the centre, immediately over this hole, and
on this flat surface rests a die frame, consisting of a
long flat piece of metal about 5 inches in length, and 2 1/2 in width having in one end a groove of about 1/4 inch long by 1/2 inch; and the other end formed into a square frame of about 1 3/4 inch square inside with small flanges across the bottom corners to support the die, and in one corner a square groove of about 1/2 inch wide to allow the screw head in the mandrel to pass through, this piece is for the purpose of adjusting and securing the mandrel to its proper place by means of the groove and bolt; In this die frame rests a die made of pewter or other suitable metal, having in the centre a hole sufficiently large to admit the mandrel.

The mandrel passes down through this die, and through the hub and top of the bench, it consists of a long round shaft of iron of about 3 feet in length by about 1 1/4 inch in diameter, having in the centre a swell of about 3/4 inch, rising from the outside of the shaft; through this swell, is formed a hole of about 1/2 inch square, for the reception of the bit, being cut through on a slope of about 1/8 of an inch to prevent the opposite end from bearing on the wood; half way round the swell is a screw hole for the purpose of securing the bit; the top of the mandrel is squared and receives a crank by which it is to be turned; the opposite end has a square hole to fit on the regulating screw beneath. This regulating screw consists of a screw rod of about 10 inches in length by 1/2 inch in diameter, having at each end a square to fit into the mandrel, so that as the mandrel turns, the screw turns, and thereby regulates the speed with which the bit cuts. The screw works in a nut and thumb screw by which it may be tightened to any spot up or down a groove, secured in an upright position beneath the bench to which it joins and descends to the length of the legs. The hub of a wheel being placed on the bench top and secured by the machine, the mandrel is let down through the die, the bit is then secured, and the lower end fitted to the regulating screw, the bit resting on the hub, the crank is now turned and the boring commenced and is continued as deep as requisite, the mandrel is then raised, the bit advanced to a sufficient projection to cut out as much more as to let in the box, the boring is then recommenced and continued to the depth of the box. The hub is now turned, and the other end bored. A small band, called a gauge collar formed to fit the mandrel, slides on the upper end of the man-drel above the die, and may be secured in any part of the length by a screw turning through it, it serves by being [illegible] to the mandrel to stop the boring at the desired point. A thin circular plate, with a hole the size of the mandrel in the centre, is laid on the top of the hub, and when the mandrel passes through it, serves to shew by its circumference, on the wings, the centre of the hub. My claim is for the whole machine as above described.

In testimony that the foregoing is a true specification of my machine as invented by me, I have hereunto set my hand this seventh day of May, in the year of our Lord Eighteen hundred and thirty [illegible].

Witnesses
C. H. W. Wharton
Henry Stone

John R. Morrison

Exd. ((12.24, [illegible]))
W.C.